United States Patent
Patel et al.

(10) Patent No.: US 8,995,446 B2
(45) Date of Patent: Mar. 31, 2015

(54) EFFICIENT GENERATION OF VPN-BASED BGP UPDATES

(75) Inventors: Keyur P. Patel, San Jose, CA (US); Nitin Kumar, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 993 days.

(21) Appl. No.: 12/643,036

(22) Filed: Dec. 21, 2009

(65) Prior Publication Data
US 2011/0149980 A1    Jun. 23, 2011

(51) Int. Cl.
| | |
|---|---|
| H04L 12/26 | (2006.01) |
| H04L 12/715 | (2013.01) |
| H04L 12/46 | (2006.01) |
| H04L 12/751 | (2013.01) |
| H04L 12/741 | (2013.01) |

(52) U.S. Cl.
CPC ............ *H04L 45/04* (2013.01); *H04L 12/4641* (2013.01); *H04L 45/02* (2013.01); *H04L 45/54* (2013.01)
USPC .................... 370/395.53; 370/409

(58) Field of Classification Search
CPC .... H04L 12/4641; H04L 45/02; H04L 45/025
USPC ..................... 370/395.53, 401, 409
See application file for complete search history.

(56) References Cited

U.S. PATENT DOCUMENTS

| | | | |
|---|---|---|---|
| 6,392,997 B1 | 5/2002 | Chen | |
| 6,567,380 B1 | 5/2003 | Chen | |
| 7,318,108 B2 | 1/2008 | Sreekantiah et al. | |
| 7,359,393 B1 | 4/2008 | Nalawade et al. | |
| 7,363,387 B1 | 4/2008 | Chandra et al. | |
| 7,486,659 B1 * | 2/2009 | Unbehagen et al. | 370/351 |
| 7,499,459 B1 | 3/2009 | Scudder et al. | |
| 7,505,402 B2 | 3/2009 | Filsfils et al. | |
| 7,508,829 B2 | 3/2009 | Rangarajan et al. | |
| 7,554,996 B2 | 6/2009 | Previdi et al. | |
| 7,590,119 B2 | 9/2009 | Djernaes et al. | |
| 7,599,312 B2 | 10/2009 | Patel et al. | |
| 7,602,796 B2 | 10/2009 | Scudder et al. | |
| 7,623,535 B2 | 11/2009 | Guichard et al. | |
| 2006/0190573 A1 * | 8/2006 | Chandra et al. | 709/220 |
| 2007/0025377 A1 | 2/2007 | Charny et al. | |
| 2007/0058638 A1 * | 3/2007 | Guichard et al. | 370/395.31 |
| 2007/0258376 A1 * | 11/2007 | Li | 370/238 |

(Continued)

*Primary Examiner* — Dang Ton
*Assistant Examiner* — Ryan Kavleski
(74) *Attorney, Agent, or Firm* — Novak Druce Connolly Bove + Quigg LLP

(57) ABSTRACT

In one embodiment, a router may store a "neighbor table" for storing the router's Border Gateway Protocol (BGP) neighbors. Each neighbor corresponds to a virtual routing and forwarding (VRF) instance and associated VRF identifier (ID), and the neighbor table indexes the BGP neighbors according to their respective VRF ID. In response to initiating a BGP update generation for a BGP table having BGP network entries, each entry having an associated VRF ID that indicates to which VRF instance the BGP entry is to be advertised, a single lookup operation for each BGP entry is performed into the neighbor table based on the corresponding VRF ID of each BGP entry to determine a corresponding VRF update group of indexed BGP neighbors to which each BGP entry is to be advertised. Accordingly, a shared BGP update may be generated for each VRF update group for the initiated BGP update generation.

20 Claims, 5 Drawing Sheets

(56) References Cited

U.S. PATENT DOCUMENTS

| | | |
|---|---|---|
| 2008/0170573 A1* | 7/2008 | Ould-Brahim ................ 370/392 |
| 2008/0170578 A1* | 7/2008 | Ould-Brahim ................ 370/401 |
| 2008/0219270 A1 | 9/2008 | Asati |
| 2008/0307110 A1 | 12/2008 | Wainner et al. |
| 2009/0080431 A1* | 3/2009 | Rekhter ........................ 370/392 |
| 2009/0080437 A1* | 3/2009 | Nguyen et al. ............ 370/395.31 |
| 2009/0296579 A1* | 12/2009 | Dharwadkar et al. ......... 370/235 |
| 2010/0265956 A1* | 10/2010 | Li ................................ 370/401 |

* cited by examiner

FIG. 4A — VPN NEIGHBOR TABLE 400a

| VRF ID 405a | NEIGHBOR 410a |
|---|---|
| X | i |
| X | j |
| Y | k |
| Y | l |
| ... | ... |
| Z | m |

FIG. 4B — VPN NEIGHBOR TABLES 400b (VRF IDs 405b / NEIGHBORS 410b)

| VRF ID X 400x |
|---|
| i |
| j |

| VRF ID Y 400y |
|---|
| k |
| l |

...

| VRF ID Z 400z |
|---|
| m |

FIG. 4C — VPN NEIGHBOR TABLE 400c

| VRF ID 405c | NEIGHBORS 410c |
|---|---|
| X | i, j |
| Y | k, l |
| ... | ... |
| Z | m |

EFFICIENT GENERATION OF VPN-BASED BGP UPDATES

TECHNICAL FIELD

The present disclosure relates generally to computer networks, and, more particularly, to Border Gateway Protocol (BGP) routing updates for virtual private networks (VPNs).

BACKGROUND

With increased VPN deployment in computer networks, scaling of VPN peers and VPN routes have become a major concern and a bottleneck at provider edge (PE) routers. For instance, current BGP implementations are generally unable to efficiently handle more than two thousand external BGP (eBGP) sessions between PE routers and customer edge (CE) routers. With eight thousand eBGP sessions, processor utilization is at a maximum, and convergence (learning and advertising routes to peers) takes an unacceptably long time. Further, for these reasons, efficient end-to-end VPN route update generation, and consequently the overall network convergence, an interest of Internet Service Providers (ISPs) to provide VPN services to as many customers as possible on the same router, has been difficult for conventional BGP implementations to achieve effectively.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-C illustrate example VPN neighbor tables.

DESCRIPTION OF EXAMPLE EMBODIMENTS

Overview

Figure 1:
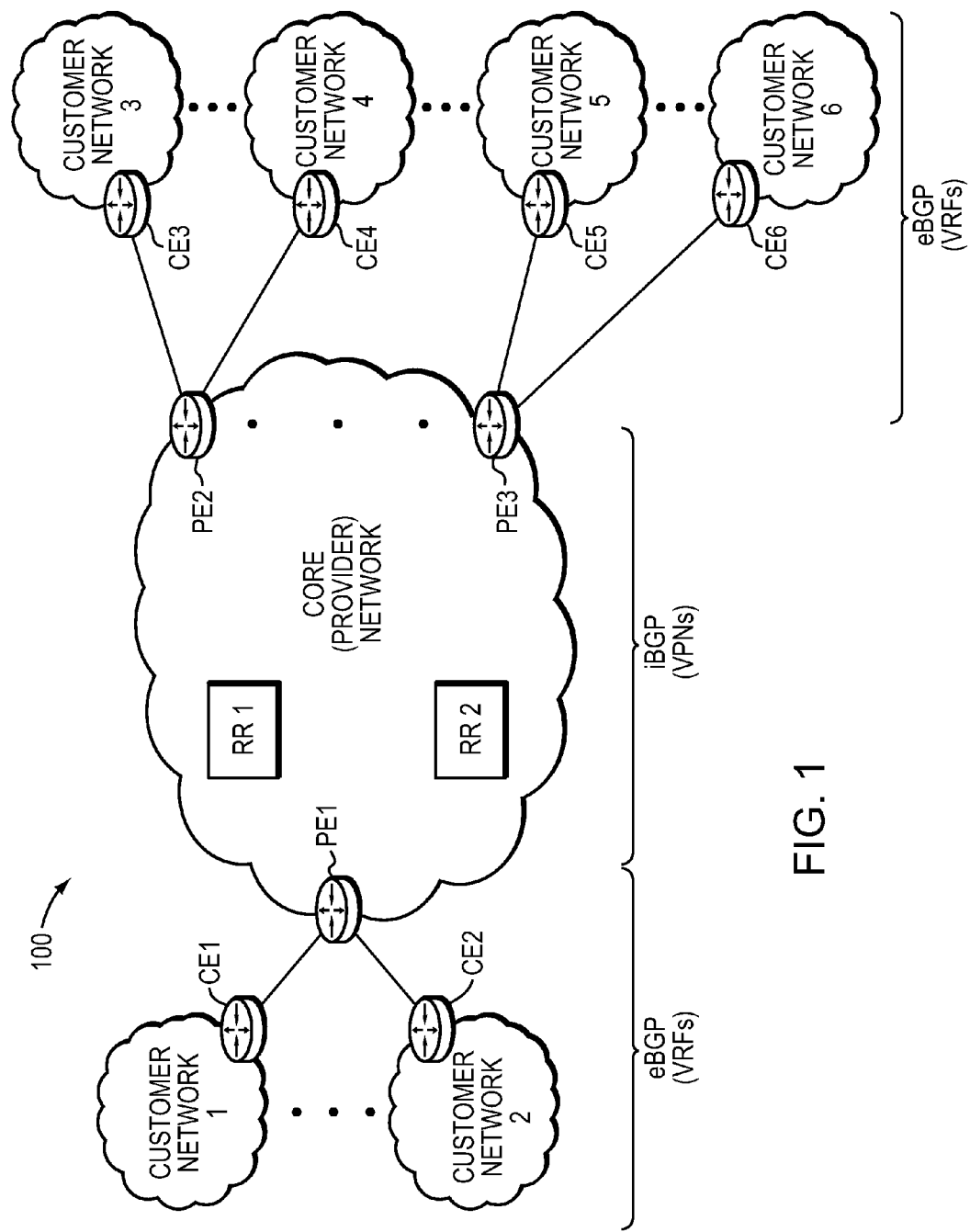
FIG. 1 illustrates an example computer network.

According to embodiments of the disclosure, a router (e.g., a PE router) may create and store a "neighbor table" for each virtual routing and forwarding (VRF) instance for storing the router's BGP VRF neighbors configured for that VRF on the router. Each such VRF neighbor corresponds to at least one virtual routing and forwarding (VRF) instance and has an associated VRF identifier (ID), and the neighbor table indexes the BGP VRF neighbors according to their respective VRF ID. In response to initiating BGP update generation for a BGP VPN route table having BGP network entries, (each entry having an associated VRF ID that indicates to which VRF instance, other than the core VRF instance unless the BGP network entry was received from the core, the BGP network entry belongs), a single lookup operation for each BGP network entry is performed into the neighbor table based on the corresponding VRF ID of each BGP network entry, to determine corresponding BGP VRF neighbors, to which each BGP network entry is to be advertised. Accordingly, a BGP update may be generated for each VRF neighbor (e.g., update group), by directly selecting only the neighbors interested in receiving that network entry.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an example computer network 100 illustratively comprising nodes/devices, such as one or more customer edge (CE) devices/routers (e.g., CE1-CE6) interconnecting respective customer networks through a core/provider network having provider edge (PE) devices/routers as shown. As described in more detail below, the CEs and PEs may participate in external (or exterior) Border Gateway Protocol (eBGP) sessions, while the PEs themselves may participate in internal (or interior) BGP (iBGP) sessions, such as through one or more route reflectors (RRs). Note that iBGP sessions and eBGP sessions may be referred to collectively as simply "BGP sessions." Those skilled in the art will understand that any number of nodes, devices, links, etc. may be used in the computer network, and that the view shown herein is for simplicity. For instance, while only a small number of devices are shown, thousands may actually be present in a typical network, such as, for example, eight thousand (8K) eBGP sessions between PE devices and CE devices, and two iBGP sessions from each PE device peering to two route reflectors.

Data packets 140 (e.g., traffic/messages) may be exchanged among the nodes/devices of the computer network 100 using predefined network communication protocols such as the Transmission Control Protocol/Internet Protocol (TCP/

IP), User Datagram Protocol (UDP), Asynchronous Transfer Mode (ATM) protocol, Frame Relay protocol, Internet Packet Exchange (IPX) protocol, etc.

Figure 2:
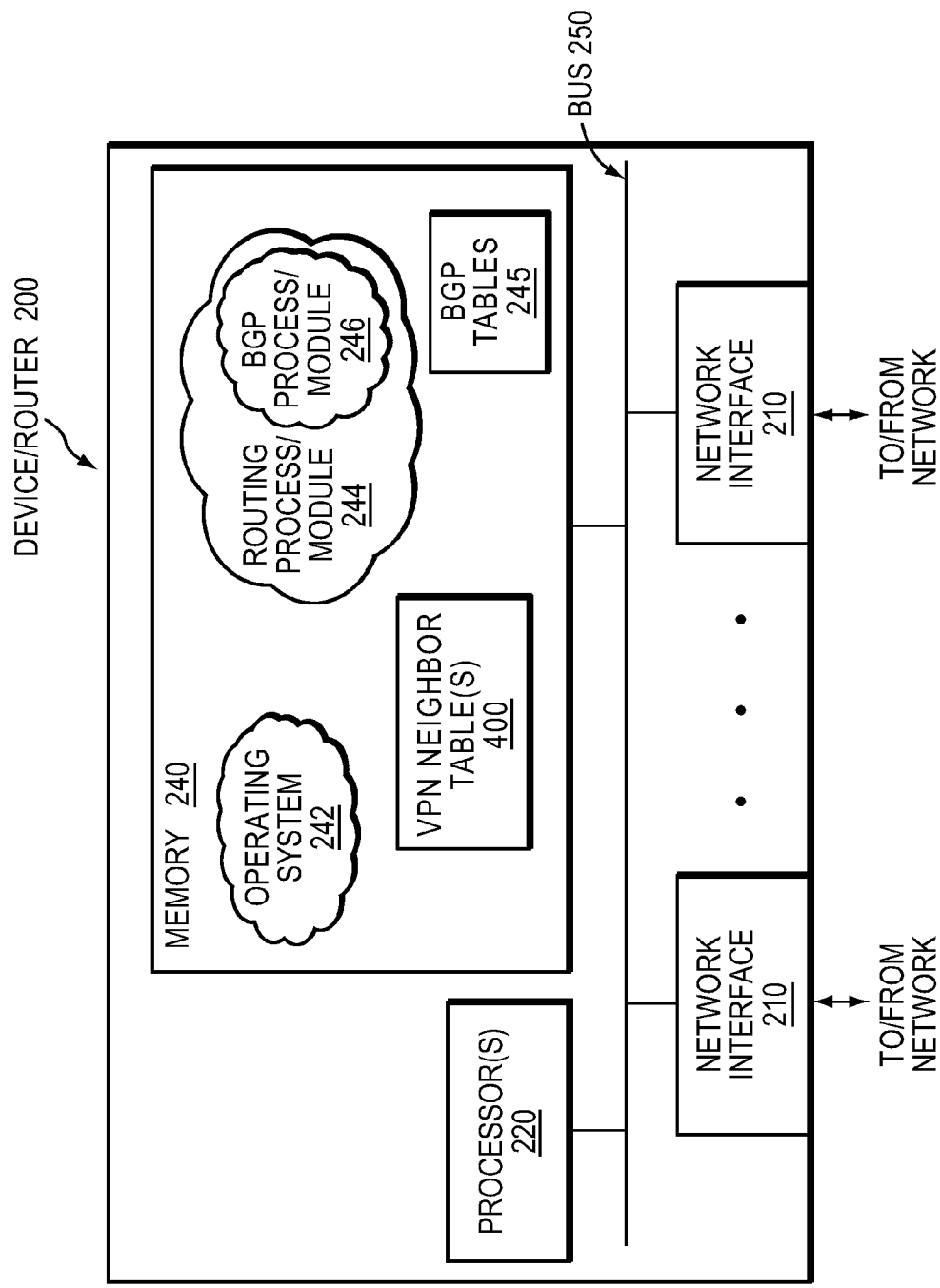
FIG. 2 illustrates an example network device/node.

FIG. 2 is a schematic block diagram of an example node/device 200 that may be used with one or more embodiments described herein, e.g., as a router such as a PE device. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures, such as a BGP table 300 and novel VPN neighbor table 400, as described below. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes, modules, and/or services executing on the device. These software processes, modules, and/or services may comprise routing process/module 244, BGP process/module 246, and others not explicitly shown. It will be apparent to those skilled in the art that other types of processors and memory, including various computer-readable media, may be used to store and execute program instructions pertaining to the techniques described herein.

Routing process/module 244 contains computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS") and the Border Gateway Protocol (BGP), shown as separate BGP sub-process/module 246. These functions may be configured to manage one or more routing and/or forwarding information databases containing, e.g., data used to make routing and/or forwarding decisions. In particular, changes in the network topology may be communicated among routers 200 using routing protocols to "converge" to an identical view of the network topology. Notably, routing services 244 may also perform functions related to virtual routing protocols, such as maintaining virtual routing and forwarding (VRF) instances, or tunneling protocols, such as for Multi-Protocol Label Switching, etc., each as will be understood by those skilled in the art.

Figure 3:
FIG. 3 illustrates an example BGP table.

In particular, BGP process/module 246 contains computer executable instructions executed by processor 220 to perform functions specifically provided by the conventional Border Gateway Protocol, as well as additional functions described herein. By participating in BGP sessions with neighboring devices ("BGP neighbors" or "BGP peers"), each device may converge its BGP table 300 on the shared network topology in order to allow the routing/forwarding of traffic within the network 100. For instance, BGP table 300, as shown in FIG. 3, may comprise one or more BGP "entries" 305, such as routes, nets, etc., and a corresponding next-hop 310. Those skilled in the art will appreciate that the BGP table 300 as shown is a simplified table, and meant for illustration only.

Additionally, as noted, VRF instances may be maintained by the routers 200. VRF instances, generally, allow for multiple virtual instances of a routing table to exist within a router simultaneously. On a basic level, each VPN in a network may utilize its own VRF instance, such that the routing information exchanged between devices (e.g., PE devices) is specific to each VPN. Often, each VRF instance corresponds to its own table (routing table or forwarding information base, "FIB"), or alternatively each table has the ability to distinguish between VRF instances. As shown in FIG. 3, BGP table 300 has a field for each entry 305 that corresponds to the VRF identification (ID) 315 of the particular entry. In this manner, an entry 305 may have different routing results (e.g., next-hop 310) depending upon which VRF instance is being utilized.

As noted above, with increased VPN deployment in computer networks, scaling of VPN peers and VPN routes have become a major concern and a bottleneck at PE routers. Current BGP implementations are generally unable to efficiently handle large numbers of BGP sessions between PE and CE routers where processor utilization is at a maximum and convergence takes an unacceptably long time. Also, efficient end-to-end VPN route convergence has been difficult for conventional BGP implementations to achieve effectively. In particular, for BGP update generation to share new or updated (changed) routing information with BGP neighbors, such as the current attribute-based BGP update generation, a device "walks" through each network entry 305 of the BGP table 300, and then spends CPU cycles considering each BGP neighbor configured on the router, to check if it is interested in the update for this network or not. While this may not be particularly problematic with a small number of entries or neighbors, an example implementation of a VPN-based BGP networks may have two million (2M) VPN routes and four thousand (4K) VRFs (e.g., eight thousand neighbors, two per VRF). In this instance, 2M entries * 4K update groups (VRFs) results in 8 billion loop call operations (comparisons), a difficult number of operations to complete within an acceptable amount of time (in a routing network), even given today's processing abilities.

Efficient VPN-Based BGP Updates

The techniques described herein may be used to optimize the current BGP update generation for BGP VPNs, for example, attribute-based BGP update generation. Specifically, the techniques herein may be used to modify attribute-based update generation to allow for intelligent VPN-based update generation, which is much faster than conventional update generation. According to embodiments of the disclosure, then, a new dynamic "VPN neighbor table" is created that stores all BGP neighbors for a VRF, indexed by the VRF ID, so that the specific neighbors for a VRF can be selected for update generation. During BGP update generation, an incremental VPN-based neighbor table walk is performed, where through use of each BGP network entry's VRF ID 315 (indicating the entry's association with a respective VPN), a single lookup is performed into the pre-populated VPN neighbor table (e.g., or a respective VPN table). This lookup may then find all the matching neighbors that correspond to that BGP network entry's VRF instance in order to efficiently generate the BGP update, without having to consider every BGP neighbor, as is currently done. Illustratively, the techniques described herein may be performed by hardware, software, and/or firmware, such as in accordance with BGP process/module 246.

Operationally, a router, such as a PE router (e.g., PE1) may be configured to store at least one neighbor table that stores its BGP neighbors. FIG. 4A illustrates an example VPN neighbor table 400a in accordance with an illustrative embodiment herein. For instance, since each BGP neighbor generally corresponds to a VRF (or global, which can also be treated as a VRF) instance, the neighbor table indexes the BGP neighbors (field 410a) according to their respective VRF ID (field 405a). It is to be noted that all BGP network entries that are advertised to a neighbor that belong to a single VRF instance, also need to be advertised to all global VRF neighbors (iBGP VPN neighbors, or other PEs in the AS), which can be indexed separately in the same table. As shown, the BGP neighbors are sorted within the neighbor table by their corresponding VRF IDs, however such sorting is not necessary, so long as the entries are indexed in some manner.

Notably, while a single table 400a is shown in FIG. 4A, a plurality of neighbor tables may be stored, such as shown in FIG. 4B, where each neighbor table 400b corresponds to a particular VRF instance and associated VRF ID. For instance, neighbor table 400x may store only BGP neighbors associated with the corresponding particular VRF ID "X", while table 400y stores BGP neighbors for VRF ID "Y", etc. (where the VRF ID results in an actual table ID). Conversely, in another alternative embodiment as shown in FIG. 4C, a single table may be used, but here the neighbor table 400c may have a plurality of entries each corresponding to a particular VRF instance and associated VRF ID (405c), each entry in the neighbor table storing only BGP neighbors (410c) associated with the corresponding particular VRF ID.

Other table arrangements may be utilized for VPN neighbor table 400, and the views shown and described herein are merely examples. VPN neighbor table 400 (400a-c, generally) thus stores BGP neighbors (e.g., and sorts them) based on their VRF IDs. As such, should VRF IDs change, or should BGP neighbors be added or removed, the dynamic nature of the table 400 would accommodate such editions, and would adjust accordingly.

In response to a scheduled BGP update generation for one or more BGP network entries to be advertised, such as when a BGP network entry is added, removed, updated, changed, etc., a BGP update generation is initiated by the router (e.g., PE1) for its BGP table 300. That is, when a BGP update generation is scheduled, the BGP process 246 selects the set of BGP network entries to be announced and then determines the set of neighbors to receive the update. Note that the BGP entries to be advertised may be a subset of BGP entries within the BGP table, where a set of entries to be announced is selected prior to determining the set of receiving neighbors. Also, as noted, each network entry in BGP table 300 has an associated VRF ID 315 that indicates to which VRF instance the BGP network entry is to be advertised (of course in addition to all global VRF neighbors, i.e. iBGP VPN neighbors, as mentioned above). For instance, for an update received from a neighbor, the BGP entry may either get an explicit VRF ID (e.g., from customer-facing devices, such as CE devices) showing its association with the VRF, or the VRF ID association is made at the time is imported into the VRF from another VPN route (e.g., from the core network, such as other PE devices or a route reflector sending VPNv4 or VPNv6 routes), as may be appreciated by those skilled in the art.

Based on the each BGP entry's corresponding VRF IDs 315 in BGP table 300, the updating router may then perform an incremental VPN-based neighbor table walk, where s a lookup is performed into the neighbor table(s) to find all BGP neighbors with a matching VRF ID. Specifically, a single lookup operation into the neighbor table is performed for each BGP entry 305 based on the corresponding VRF ID 315 to determine a corresponding VRF update group of indexed BGP neighbors to which each BGP entry is to be advertised. The VRF update groups, that is, are the set of any BGP neighbors belonging to a particular VRF instance (indexed by the instance), which thus share the same VRF ID 405a, or may be found in a same VRF-based table 400b, or may be located in a same VRF-related entry 410c, etc., as noted above.

BGP entries may be the result of routes/prefixes learned from VRF peers that are to be advertised to other VRF peers (e.g., CE routers), as well as to the core network, such as to be reached by other VRF peers across the core network. Such BGP entries have a VRF ID (e.g., non-zero) that corresponds to their particular VRF instance. These BGP entries could also be learned from remote iBGP neighbors, in which case, before they are imported into the VRFs, they may have a VRF ID that corresponds specifically to the core or global VRF (VRF ID of "0"). For these core BGP entries illustratively having a core VRF ID of "0" (zero), for instance, VPNv4 or VPNv6 entries, then the lookup operation is performed after they are imported into the VRFs, at which time they get the correct VRF IDs of the corresponding VRF, based on the neighbor table index and are hence advertised to the VRF CE neighbors. Conversely, the "single" lookup operation performed into the VPN neighbor table for BGP entries having a specific (e.g., non-zero) VRF ID, that is, customer-facing VRF IDs, is based on the specific VRF ID to determine the VRF neighbors (eBGP neighbors), as well as the core VRF ID to determine the core VRF update group (iBGP neighbors). This additional lookup operation utilizing the core VRF ID index may be considered as a second lookup operation, or as a subset of the "single" lookup operation, accordingly.

In this manner, rather than taking each BGP entry and looking at all BGP neighbors to determine whether it should receive an advertisement of the entry, the techniques herein use the VRF ID to directly index the set of interested neighbors (an update group) to receive the advertisement. In the example above, where there are 4K VRF update groups, previous techniques would perform a lookup operation to all 4K VRF update groups for each of the 2M BGP entry (resulting in 8 billion loop call operations). With the techniques herein, each of the 2M entries results in only one or two lookup operations that directly use the VRF ID to index into the novel VPN neighbor table(s), alleviating having to look at the remaining and non-applicable VRF update groups.

Once all of the BGP entries 305 to be advertised have been "walked through" during the BGP update generation, and the corresponding VRF update groups have been determined for each entry (e.g., sharing a same outbound policy), then a shared BGP update may be generated for each VRF update group (consisting of a set of BGP neighbors, to whom the same update generated is copied) that are interested in the corresponding BGP entries. Alternatively, the BGP updates may be generated in parallel to the BGP table walk, where the updates are adjusted based on newly discovered BGP entries that correspond to an associated VRF update group for which a BGP entry has been created. The one or more generated BGP updates may then be advertised to the appropriate BGP neighbors in a conventional manner.

Figure 5:
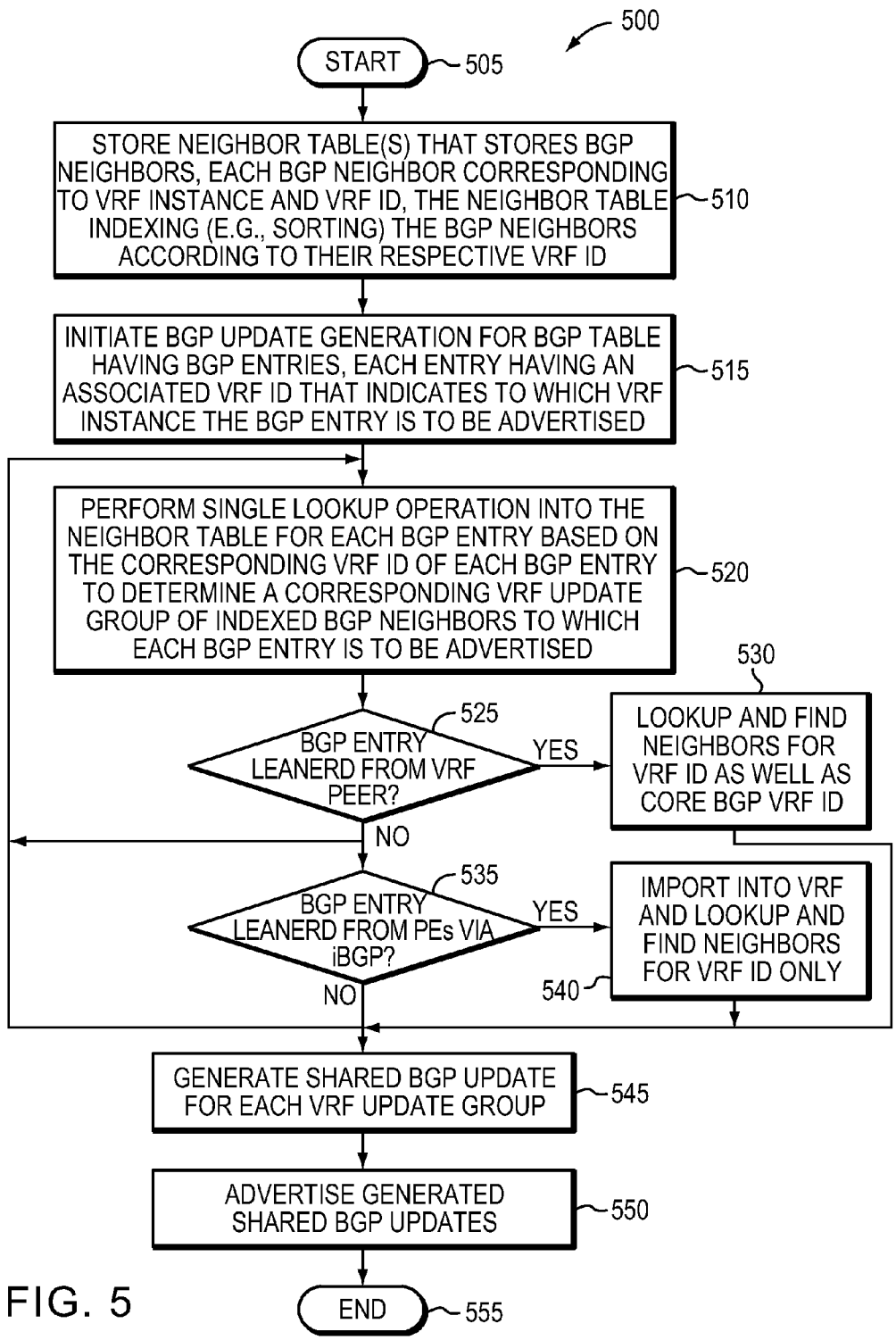
FIG. 5 illustrates an example procedure for efficient VPN-based BGP updates.

FIG. 5 illustrates a simplified example procedure for efficient generation of VPN-based BGP updates in accordance with one or more embodiments described herein. The procedure 500 starts at step 505, and continues to step 510, where a router (e.g., PE1) stores a neighbor table 400 as described above. Upon initiating a BGP update generation in step 515 for BGP table 300, in step 520 the router may then perform a single lookup operation into the neighbor table for each BGP entry based on the corresponding VRF ID of each BGP entry to determine a corresponding VRF update group of indexed BGP neighbors to which each BGP entry is to be advertised. As described in more detail above, in the event the VRF ID for an entry is learned from a VRF peer (e.g., non-zero) in step 525, then in step 530 the VRF ID is used for the lookup as well as a core BGP VRF ID (e.g., VRF ID=zero). Alternatively, if the BGP entry is learned from PE routers (e.g., via iBGP) in step 535, then it is imported into the appropriate VRF in step 540, along with the associated lookup to find neighbors for that VRF ID only. Step 520 is performed for each entry in the BGP table to be advertised, and in step 545, which may be performed simultaneously or upon conclusion of BGP entry lookups in step 520, a shared BGP update may be generated for each VRF update group corresponding to at least one BGP entry. Once the update is advertised in step 550, the procedure ends in step 555.

The novel techniques described herein enhance BGP scalability limits for use with VPN/VRF networks. Through attribute-based BGP update generation for selective VPN neighbor processing (based on VRFs), the novel techniques may achieve faster convergence for BGP VPNs. In particular, the techniques described above for VPN-based BGP update generation, which decouple BGP VPN convergence from the number of VRF/BGP neighbors, are more efficient than the standard model of attribute-based BGP update generation, which subjects each BGP entry (route/net/prefix) to all of its BGP configured peers. In other words, the embodiments herein translate from "n*p" conventional BGP operations, where "n" is the number of BGP entries, and "p" is the number of BGP peers, to "n*v," where "v" is a core update group (RR update group) plus in certain circumstances an additional VRF update group (i.e., "v" is either 1 or 2). For instance, using the example two million (2M) VPN routes and four thousand (4K) VRFs (e.g., eight thousand neighbors, two per VRF) from above, the techniques above optimizes from:

2M entries * 4K update groups (VRFs)=8 billion loop call operations, to:

2M entries * (1 RR update group+1 possible VRF update group)=2 to 4 million loop call operations.

In this manner, in addition to allowing VPN routes to be converged at a much faster rate than conventional attribute-based BGP updates, the embodiments herein support a higher number of VPNs (e.g., 4000) and VPN routes (e.g., 2M). By supporting large numbers of BGP sessions for both iBGP (RR application) and eBGP (PE-CE and internet peering applications) with millions of routes, as well as converging on them quickly, the embodiments herein facilitate End-to-End VPN convergence.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   storing, at a router, at least one neighbor table that indexes each of one or more Border Gateway Protocol (BGP) neighbors of the router by a respective virtual routing and forwarding instance identifier (VRF ID) that indicates a virtual routing and forwarding (VRF) instance associated with the BGP neighbor, each BGP neighbor being a network device with which the router establishes a BGP session;
   initiating a BGP update generation for a BGP table having one or more BGP network entries to be advertised, each entry having an associated VRF ID that indicates to which VRF instance the BGP entry is to be advertised;
   in response to initiating the BGP update generation, performing a single lookup operation into the neighbor table for each BGP entry based on the associated VRF ID of each BGP entry, to determine a corresponding VRF update group of indexed BGP neighbors to which each BGP entry is to be advertised; and
   generating a shared BGP update for each VRF update group for the initiated BGP update generation.

2. The method as in claim 1, further comprising:
   advertising one or more generated shared BGP updates.

3. The method as in claim 1, wherein a particular VRF update group to receive core BGP entries comprises core BGP neighbors.

4. The method as in claim 3, wherein core BGP entries are selected from a group consisting of virtual private network version 4 (VPNv4) or VPN version 6 (VPNv6) entries.

5. The method as in claim 3, wherein a particular VRF ID that corresponds to core BGP entries is VRF ID 0 (zero).

6. The method as in claim 3, wherein the core BGP neighbors comprise a BGP route reflector (RR).

7. The method as in claim 1, further comprising, in response to the corresponding VRF ID for a particular BGP entry being a customer-router learned entry:
   performing the single lookup operation into the neighbor table for the corresponding VRF ID; and
   performing a second lookup operation into the neighbor table for a core BGP VRF ID.

8. The method as in claim 7, wherein the corresponding VRF ID is a non-zero VRF ID.

9. The method as in claim 1, wherein the BGP update generation is attribute based.

10. The method as in claim 1, wherein storing comprises:
    storing a plurality of neighbor tables, each neighbor table corresponding to a particular VRF instance and associated VRF ID, each neighbor table storing only BGP neighbors associated with the corresponding particular VRF ID.

11. The method as in claim 1, wherein storing comprises:
    storing a single neighbor table, the neighbor table having a plurality of entries each corresponding to a particular VRF instance and associated VRF ID, each entry in the neighbor table storing only BGP neighbors associated with the corresponding particular VRF ID.

12. The method as in claim 1, further comprising:
    sorting BGP neighbors within the neighbor table by the corresponding BGP neighbor VRF IDs.

13. The method as in claim 1, wherein the BGP entries to be advertised are a subset of BGP entries within the BGP table.

14. The method as in claim 1, wherein the BGP update generation is initiated in response to an event selected from a group consisting of: a new BGP entry, and a changed BGP entry.

15. An apparatus, comprising:
one or more network interfaces configured to participate in a Border Gateway Protocol (BGP) session with one or more BGP neighbors;
one or more processors coupled to the network interfaces and configured to execute one or more processes;
a memory storing at least one neighbor table that indexes one or more of the BGP neighbors by a respective virtual routing and forwarding instance identifier (VRF ID) that indicates a virtual routing and forwarding (VRF) instance associated with the BGP neighbor, each BGP neighbor being a network device with which the apparatus establishes a BGP session; and
a BGP module configured to:
initiate a BGP update generation for a BGP table having one or more BGP network entries to be advertised, each entry having an associated VRF ID that indicates to which VRF instance the BGP entry is to be advertised;
in response to initiation of the BGP update generation, perform a single lookup operation into the neighbor table for each BGP entry based on the associated VRF ID of each BGP entry, to determine a corresponding VRF update group of indexed BGP neighbors to which each BGP entry is to be advertised; and
generate a shared BGP update for each VRF update group for the initiated BGP update generation.

16. The apparatus as in claim 15, wherein a particular VRF update group to receive VRF learned BGP entries comprises core BGP neighbors.

17. The apparatus as in claim 15, wherein the BGP module is configured to, in response to the corresponding VRF ID for a particular BGP entry being a customer-router learned entry:
perform the single lookup operation into the neighbor table for the corresponding VRF ID; and
perform a second lookup operation into the neighbor table for a core BGP VRF ID.

18. A non-transitory computer-readable media having software encoded thereon, the software when executed on a computer operable to:
access at least one neighbor table that indexes one or more Border Gateway Protocol (BGP) neighbors of the computer by a respective virtual routing and forwarding instance identifier (VRF ID) that indicates a virtual routing and forwarding (VRF) instance associated with the BGP neighbor, each BGP neighbor being a network device with which a BGP session is established;
initiate a BGP update generation for a BGP table having one or more BGP network entries to be advertised, each entry having an associated VRF ID that indicates to which VRF instance the BGP entry is to be advertised;
in response to initiation of the BGP update generation, perform a single lookup operation into the neighbor table for each BGP entry based on the associated VRF ID of each BGP entry, to determine a corresponding VRF update group of indexed BGP neighbors to which each BGP entry is to be advertised; and
generate a shared BGP update for each VRF update group for the initiated BGP update generation.

19. The non-transitory computer-readable media as in claim 18, wherein a particular VRF update group to receive VRF learned BGP entries comprises core BGP neighbors.

20. The non-transitory computer-readable media as in claim 18, when executed further operable to, in response to the corresponding VRF ID for a particular BGP entry being a customer-router learned entry:
perform the single lookup operation into the neighbor table for the corresponding VRF ID; and
perform a second lookup operation into the neighbor table for a core BGP VRF ID.

\* \* \* \* \*